United States Patent [19]

Neyret

[11] Patent Number: 4,685,313

[45] Date of Patent: Aug. 11, 1987

[54] ANTI-THEFT DEVICE WITH KEY PRESENCE SECURITY

[75] Inventor: Guy Neyret, Francheville, France

[73] Assignee: Neiman, Courbevoie, France

[21] Appl. No.: 930,903

[22] Filed: Nov. 17, 1986

[30] Foreign Application Priority Data

Dec. 11, 1985 [FR] France ............... 85 18330

[51] Int. Cl.[4] ........................... B60R 25/02
[52] U.S. Cl. ........................... 70/186; 70/252
[58] Field of Search .............. 70/186, 182–185, 70/252

[56] References Cited

U.S. PATENT DOCUMENTS

| 3,566,635 | 3/1971 | Wolter | 70/252 |
| 3,959,996 | 6/1976 | Thirion | 70/186 |
| 4,313,519 | 2/1982 | Lipschutz | 70/252 |
| 4,495,786 | 1/1985 | Maseki | 70/186 |

Primary Examiner—Robert L. Wolfe
Attorney, Agent, or Firm—James C. Wray

[57] ABSTRACT

The invention relates to an anti-theft steering lock for automobile vehicle, of the type comprising a bolt thrust elastically into the locking position and controlled by the rotation of a key rotor, and means for retaining the bolt in the retracted position which are set out of action by the withdrawal of the key.

The anti-theft device according to the invention is characterized in that the said retaining means comprise a key sensor sliding radially in the rotor and co-operating, in the locking angular position of the rotor, with a slide block movable in the lock housing at right angles to the axis of the rotor and thrust elastically towards the said rotor, the said slide block co-operating with an aperture of a slider fast in translational movement with the said bolt, the said aperture being prolonged towards the rear by a narrower slot, the said slide block having a width slightly less than that of the said slot and comprising, over a part of its height, an excess thickness of width greater than that of the said slot but less than that of the said aperture.

3 Claims, 4 Drawing Figures

ANTI-THEFT DEVICE WITH KEY PRESENCE SECURITY

BACKGROUND TO THE INVENTION

The invention relates to an anti-theft steering lock for an automibile vehicle, of the type comprising a bolt thrust elastically into the locking position and controlled by the rotation of a key rotor and means for retaining the bolt in the retracted position which are set out of action by the withdrawal of the key.

In order to prevent involuntary locking of the steering on return of the key into the stop position, while the vehicle may still be moving, anti-theft devices must comprise means permitting the liberation of the locking bolt only by a voluntary action by the driver. In general this voluntary action by the driver is constituted by the withdrawal of the key.

STATEMENT OF PRIOR ART

An anti-theft device is known in which the security device is constituted by a sensor lodged in the rotor and sliding at right angles to the axis of the rotor, which in the locking angular position cooperates with one extremity of a lever the other extremity of which co-operates with the bolt. This lever, to permit the movement of the anti-theft device, must have an oscillating spindle and be subject to the action of a return spring, which involves delicate fitting and limited security of operation by reason especially of the vibrations affecting the said lever.

OBJECT OF THE INVENTION

An object of the present invention is to obtain sure and economic means, with simple fitting, for the stopping of the locking bolt as long as the key is not withdrawn.

SUMMARY OF THE INVENTION

For this purpose the anti-theft device according to the invention is characterised in that the said retaining means comprise a key sensor sliding radially in the rotor and co-operating, in the locking angular position of the rotor, with a slide block movable in the lock casing at right angles to the axis of the rotor and thrust elastically towards the said rotor, the said slide block co-operating with an aperture of a slider fast in translation with the said bolt, the said aperture being prolonged towards the rear by a narrower slot, the said slide block having a width slightly less than that of the said slot and comprising, over a part of its height, an excess thickness of width greater than that of the said slot but less than that of the said aperture.

BRIEF DESCRIPTION OF DRAWINGS

The invention will be clearly understood on reading of the following description given with reference to the accompanying drawing, wherein.

DESCRIPTION OF PREFERRED EMBODIMENTS

Figure 1:
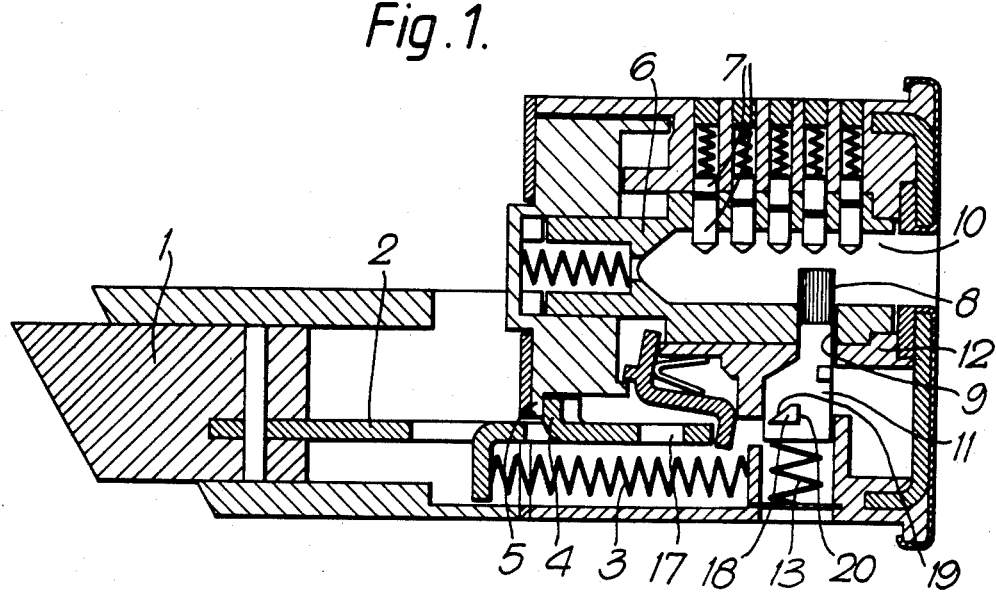
FIG. 1 is a longitudinal sectional view of an anti-theft device according to an example of embodiment of the invention, in the locking position.

In the example as described, the anti-theft device comprises a locking bolt 1 fast in translation with a slider 2 thrust into the locking position by a spring 3. The slider 2 comprises a protuberance 4 which cooperates with a rotating cam 5 to produce thrusting of the bolt into the unlocking position. The cam 5 is fast in rotation with the rotor 6 of a piston lock 7. In the example as represented the rotor 6 is slidable to come into engagement with the cam 5 but the invention is of course applicable to conventional locks with non-sliding rotor.

In accordance with the invention a sensor 8 slides in a radial hole 9 of the rotor 6 and can penetrate into the passage 10 of the rotor 6 intended to receive the key. The sensor 8 is in abutment at its end opposite to the passage 10 upon a slide block 11 movable radially in the stator 12 of the lock and penetrating into the hole 9. The slide block 11 is thrust towards the rotor 6 by a spring 13.

The slide block 11 comprises a sole-piece 14 limiting its displacement in the stator 12 and a body 15 of slight width which can slide in a slot 16 formed at the extremity of the slider 2. The slot 16 opens into an aperture 17 of greater width. The body 15 of the slide block 11 comprises an excess thickness 18 of width greater than that of the slot 16 but less than that of the aperture 17. The excess thickness 18 comprises a bevel 19 towards the slider 2 and a heel piece 20 on the opposite side.

Figure 2:
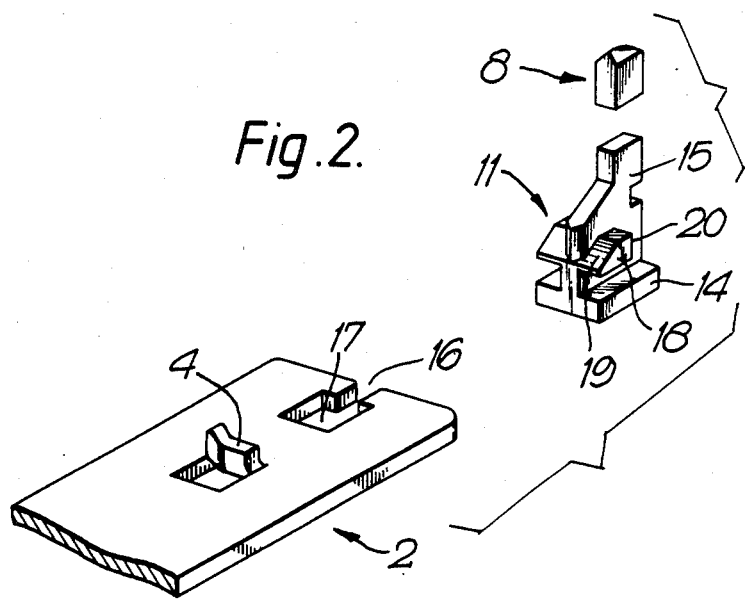
FIG. 2 is a diagrammatic perspective view of a part of the anti-theft device according to FIG. 1 in the locking position.

In the locking position (FIGS. 1 and 2) the passage 10 is empty and the sensor 8, thrust by the slide block 11 under the action of the spring 13, has penetrated into the passage 10. The bolt 1 is in the advanced position, under the action of the spring 3, and the slider 2 has completely escaped from the slide block 11.

The introduction of the key 21 into the passage 10 pushes back the sensor 8 and the slide block 11 against the action of the spring 13. The sensor 8 comprises a pointed head co-operating with the point of the key to facilitate this movement. The position of the slide block 11 is such that the excess thickness 18 is facing the slot 16 of the slider 2.

Figure 3:
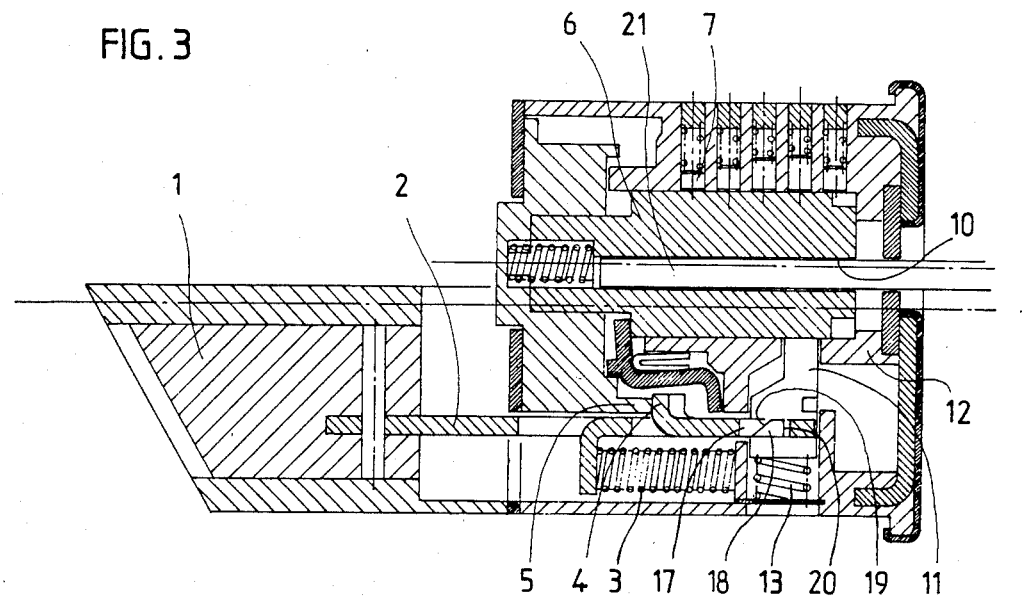
FIG. 3 is analogous with FIG. 1, with the anti-theft device in the position for driving of the vehicle

The rotation of the key 21, through the intermediary of the rotor 6, produces a rotation of the cam 5 which, through the intermediary of the protuberance 4 of the slider 2, returns the bolt 1 against the action of the spring 3. In the course of this translational movement the free extremity of the slider 2 comes to abut on the slide block 11 and the slot 16 comes on both sides of the body 15. The free extremity of the slider slips over the bevel 19 slightly pressing the slide block 11 downwards (in the drawing) against the action of the spring 13. At the end of the translational movement the excess thickness 18 of the slide block 11 is lodged wholly in aperture 17 and the heel piece 20 is facing the edge of the aperture 17 into which the slot 16 opens. This position is represented in FIG. 3.

Figure 4:
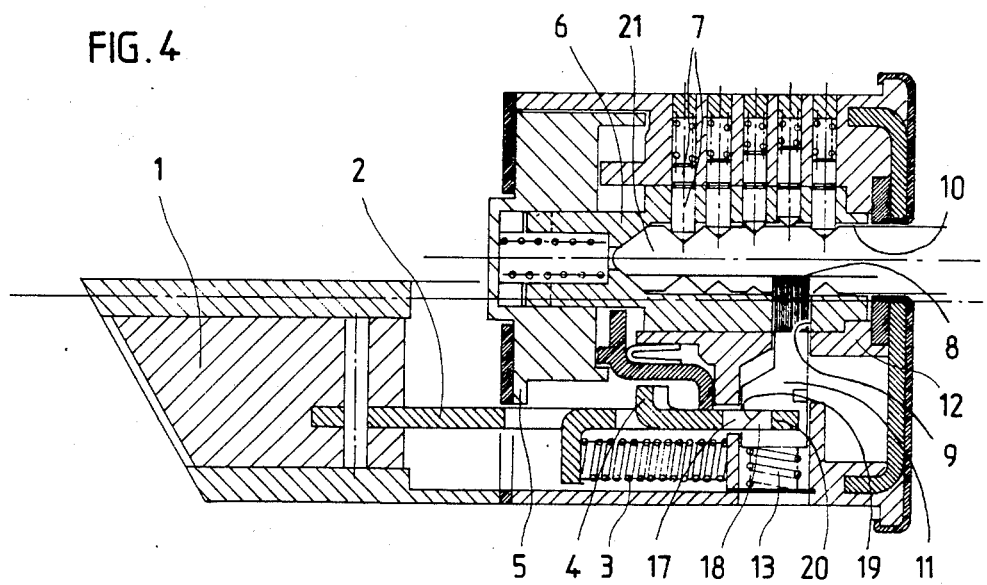
FIG. 4 is analagous with FIGS. 1 and 3, the anti-theft device being unlocked, in the key withdrawl position.

When the key 21 is turned in the opposite direction to bring it to the withdrawal position (FIG. 4), the cam 5 is no longer pressing upon the protuberance 4 of the slider 2 and the latter, under the action of the spring 3, moves towards the left (in the drawing) but this displacement is limited by the abutment of the extremity of the aperture 17 adjacent to the slot 16 against the heel piece 20 of the excess thickness 18. The bolt 1 is held retracted.

If next the key 21 is withdrawn, as soon as the key point has passed the sensor 8 the latter penetrates into the passage 10 under the action of the spring 13 acting upon the slide block 11. The slide block 11 moves at the same time and as soon as the heel piece 20 escapes the aperture 17, the slider 2 is liberated and slides under the action of the spring 3, the slot 16 sliding around the body 15 of the slide block 11. The bolt 1 returns to abut on the steering shaft (not represented) and after rotation of the steering wheel penetrates into the slot of a locking sleeve of the steering shaft. The anti-theft device has returned to its locking position according to FIG. 1.

I claim:

1. Anti-theft steering lock for automobile vehicle, comprising
    (a) a bolt movable between locked and unlocked position,
    (b) resilient means for urging said bolt towards the locked position,
    (c) a key rotor for controlling the bolt on rotation of the rotor,
    (d) means for retaining the bolt in the retracted position which are set out of action by withdrawal of the key, said retaining means comprising,
    (e) a key sensor slidable radially in the rotor,
    (f) a slide block movable in the anti-theft lock housing at right angles to the axis of the rotor, and
    (g) further resilient means for urging said slide block towards the said rotor, the said slide block cooperating with the key sensor in the locking angular position of the rotor and with an aperture of a slider fast in translational movement with the said bolt, said aperture being prolonged towards the rear by a slot of narrower width, said slide block having a width slightly less than that of said slot and comprising, over a part of its height, an excess thickness of width greater than that of the said slot but less than that of the said aperture.

2. Anti-theft device according the claim 1, wherein said excess thickness comprises a bevel in the direction of the bolt.

3. Anti-theft device according to claim 1, wherein said excess thickness comprises a heel piece in the direction opposite to the bolt.

* * * * *